(12) United States Patent
Chung et al.

(10) Patent No.: US 9,132,865 B2
(45) Date of Patent: Sep. 15, 2015

(54) COWL STRUCTURE OF VEHICLE

(71) Applicant: Hyundai Motor Company, Seoul (KR)

(72) Inventors: Hee-Suk Chung, Whasung-Si (KR);
Dae-Hyun Song, Whasung-Si (KR);
Ki-Hwan Kim, Whasung-Si (KR);
Jin-Sung Lee, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 9 days.

(21) Appl. No.: 14/094,174

(22) Filed: Dec. 2, 2013

(65) Prior Publication Data
US 2015/0021953 A1    Jan. 22, 2015

(30) Foreign Application Priority Data

Jul. 22, 2013    (KR) .......................... 10-2013-0085922

(51) Int. Cl.
*B60N 99/00* (2006.01)
*B62D 27/02* (2006.01)
*B62D 25/04* (2006.01)
*B62D 25/08* (2006.01)

(52) U.S. Cl.
CPC .............. *B62D 27/023* (2013.01); *B62D 25/04* (2013.01); *B62D 25/081* (2013.01); *B62D 25/082* (2013.01); *B62D 25/088* (2013.01)

(58) Field of Classification Search
CPC .... B62D 27/023; B62D 25/081; B62D 25/04; B62D 25/088; B62D 25/082
See application file for complete search history.

(56) References Cited

U.S. PATENT DOCUMENTS

| | | | | |
|---|---|---|---|---|
| 1,751,828 A | * | 3/1930 | Marshall | 296/192 |
| 4,270,793 A | * | 6/1981 | Harasaki et al. | 296/192 |
| 4,545,612 A | * | 10/1985 | Harasaki | 296/203.02 |
| 2008/0224502 A1 | * | 9/2008 | Miki | 296/203.02 |
| 2011/0031781 A1 | * | 2/2011 | Nishimura et al. | 296/187.12 |
| 2011/0266833 A1 | * | 11/2011 | Hattori | 296/187.12 |
| 2014/0054926 A1 | * | 2/2014 | Pyun | 296/187.09 |
| 2015/0021953 A1 | * | 1/2015 | Chung et al. | 296/187.09 |

FOREIGN PATENT DOCUMENTS

KR    10-2004-0029778 A    4/2004
KR    10-2012-0051539 A    5/2012

* cited by examiner

*Primary Examiner* — Lori L Lyjak
(74) *Attorney, Agent, or Firm* — Morgan, Lewis & Bockius LLP

(57) ABSTRACT

A cowl structure of a vehicle includes: A-pillars vertically arranged at both sides of a vehicle body; an apron upper member arranged on a front of each of the A-pillars to be longitudinally elongated therefrom; a shock absorber housing formed under the apron upper members; a cowl transversely arranged between the apron upper members; and an engine compartment extension panel connected between the cowl and the apron upper member so as to form an extended plane on both sides of the cowl corresponding to the cowl. The apron upper member is integrally formed with the A-pillar in the longitudinal direction of the vehicle body, and both sides of the cowl are cut along the shape of the engine compartment extension panel so as to correspond to the engine compartment extension panel.

4 Claims, 9 Drawing Sheets

COWL STRUCTURE OF VEHICLE

CROSS-REFERENCE TO RELATED APPLICATION

The present application claims priority of Korean Patent Application Number 10-2013-0085922 filed Jul. 22, 2013, the entire contents of which application is incorporated herein for all purposes by this reference.

BACKGROUND OF INVENTION

1. Field of Invention

The present disclosure relates to a cowl structure of a vehicle. More particularly, it relates to a cowl structure of a vehicle which has a configuration of a changed apron upper member and cowl, and is provided with an engine compartment extension panel and A-pillar, thereby decreasing a damage exerted to a chest of an occupant seated in the driver seat during a vehicle collision and increasing a torsional rigidity of a vehicle body.

2. Description of Related Art

In general, a vehicle consists largely of a vehicle body and a chassis. The vehicle body is a portion which forms an outer appearance of the vehicle, and the chassis is a portion on which at least mechanical apparatus necessary for driving the vehicle are mounted.

A vehicle cowl is a portion of the vehicle body and refers to a front panel portion which is connected to a front window frame of the vehicle. Generally, the cowl has a shape designed to minimize a resistance of the air generated by the flow of air during driving.

Specifically, as a performance test for a vehicle, there is a small overlap crash test wherein only over 25% of the front part of a vehicle body is collided with a fixed obstacle while a vehicle is driven at a speed of 64 km per hour. Recently, in order to respond to the small overlap crash test, various researches into increasing a rigidity of the vehicle cowl have been actively conducted.

As shown in FIG. 1A, a conventional cowl structure for a vehicle includes A-pillar 1 arranged in a vertical direction of the vehicle body, an apron upper member 2 which is arranged on a front of the A-pillar 1 spaced apart therefrom in a longitudinal direction of the vehicle body, and a cowl 4 arranged between the A-pillar 1 and the apron upper member 2 across a vehicle width direction of the vehicle body.

In addition, as shown in FIG. 1B, a cowl cross bracket 5 is connected to the A-pillar 1, and an A-pillar extension panel 3 is fastened between the cowl 4 and the cowl cross bracket 5 by bolts.

However, in the conventional cowl structure for a vehicle, as shown in FIG. 2, since a joint part between the apron upper member 2 and the cowl 4 has a discrete cross section, the rigidity thereof is decreased, and thus shock absorption performance during a vehicle collision is reduced, and further the rigidity at an impact point of the vehicle body decreases, and thus the cowl 4 is to be bent during the vehicle collision, and thereby a chest injury to an occupant seated in the driver seat may become serious due to a deformation thereof.

When a corner section of the joint part between the A-pillar 1 and the cowl 4 is collapsed by a vehicle front collision, for instance, the cowl 4 is pushed reward. In order to improve such a phenomenon, an extension panel 3 and a cowl cross bar bracket 5 has to be further fixed to the joint part between the A-pillar 1 and the cowl 4 by fastening bolts, and thus there is an increase in the number of vehicle body parts, as well as manpower and costs required for bolt fastening work.

The information disclosed in this Background section is only for enhancement of understanding of the general background of the invention and should not be taken as an acknowledgement or any form of suggestion that this information forms the prior art already known to a person skilled in the art.

BRIEF SUMMARY

The present invention has been made in an effort to solve the above-described problems associated with prior art. Various aspects of the present invention provide for a cowl structure of a vehicle which is able to improve the performance of a vehicle small overlap crash by changing the cowl structure of a vehicle and increasing the rigidity of a joint part between an apron upper member and an A-pillar and a cowl.

Various aspects of the present invention provide for a cowl structure for a vehicle including: A-pillars arranged at both sides of a vehicle body in a vertical direction of the vehicle body; an apron upper member which is arranged on a front of each of the A-pillars to be elongated therefrom in a longitudinal direction of the vehicle body; a shock absorber housing formed under each of the apron upper members; a cowl arranged between the apron upper members across a vehicle width direction of the vehicle body; and an engine compartment extension panel which is connected between the cowl and the apron upper member so as to form an extended plane on both sides of the cowl corresponding to the cowl.

The apron upper member may be integrally formed with the A-pillar in the longitudinal direction of the vehicle body, and both sides of the cowl are cut along the shape of the engine compartment extension panel so as to correspond to the engine compartment extension panel.

The A-pillar may further comprise a cut-out portion formed thereon at a position near to a rear end of the apron upper member, and the A-pillar extension panel is connected to the A-pillar so as to completely enclose the cut-out portion.

A front end of the engine compartment extension panel may be combined to an upper portion of the shock absorber housing and a rear end thereof is connected to the A-pillar extension panel.

The engine compartment extension panel and the A-pillar extension panel may be made of super-high-strength steel.

The present methods and apparatuses have other features and advantages apparent from the accompanying drawings, incorporated herein, and below Detailed Description, which together serve to explain certain principles of the present invention.

Figure 1A:
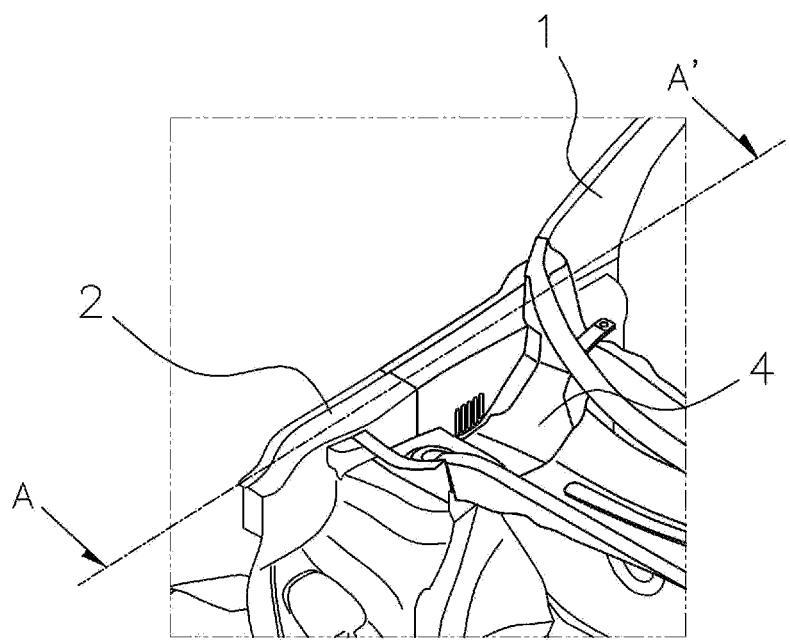
FIG. 1A is a perspective view showing a cowl structure of a vehicle of a related art, which is seen from an engine compartment portion.

It should be understood that the appended drawings are not necessarily to scale, presenting a somewhat simplified representation of various features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 3:
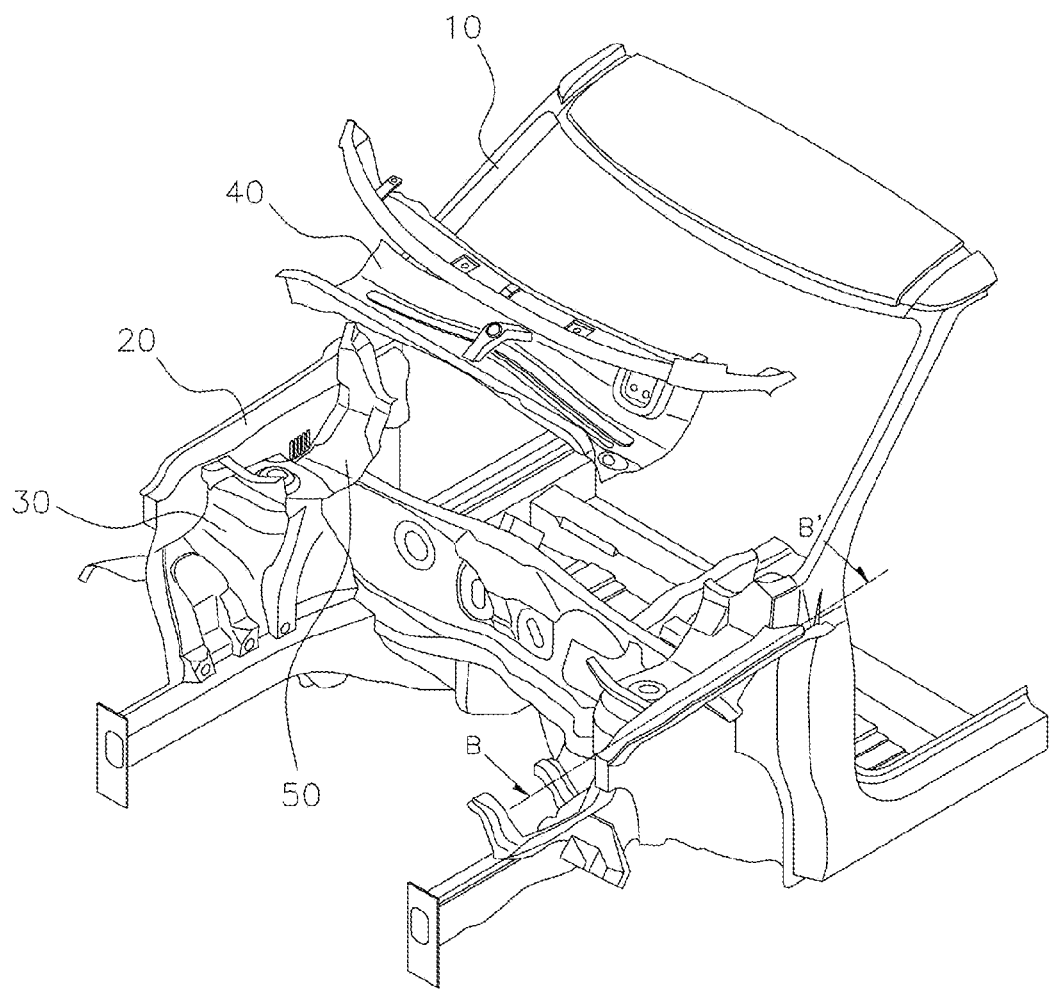
FIG. 3 is a perspective view showing an exemplary cowl structure of a vehicle with a cowl connected thereto according to the present invention.
Figure 4:
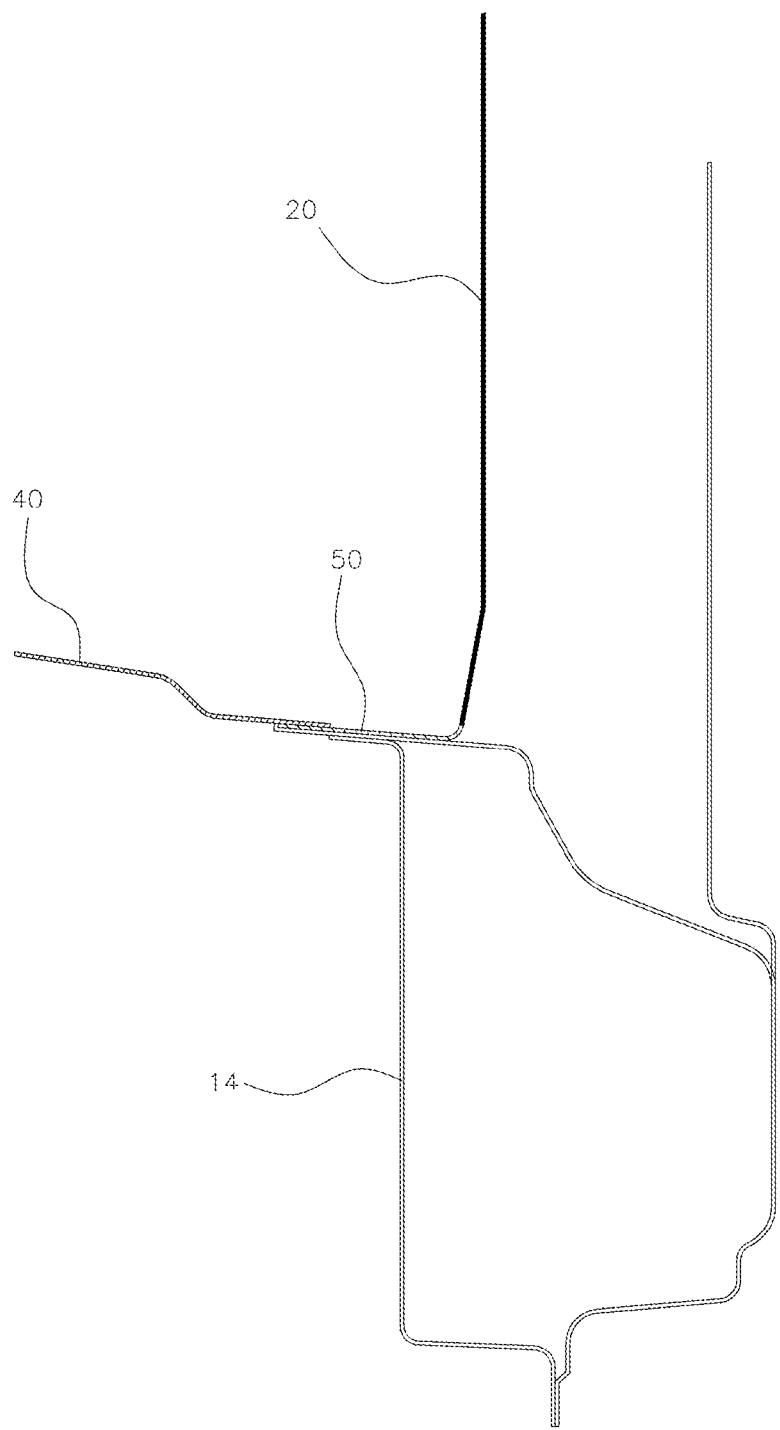
FIG. 4 is a cross-sectional view taken along a line B-B' of FIG. 3.
Figure 5:
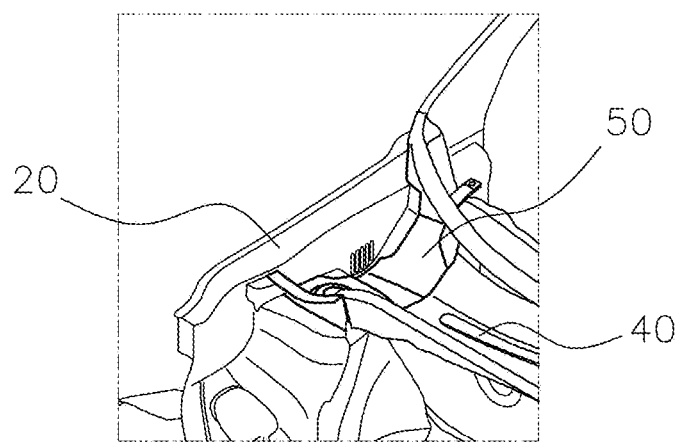
FIG. 5 is an enlarged view showing an exemplary apron upper member, engine compartment extension panel, and cowl connected one another according to the present invention.

FIGS. 3 to 5 are views showing a cowl structure of a vehicle according to various embodiments of the present invention. A cowl structure of a vehicle according to various embodiments of the present invention includes: A-pillars 10 arranged at both sides of a vehicle body in a vertical direction of the vehicle body; an apron upper member 20 which is arranged on a front of each of the A-pillars 10 to be elongated therefrom in a longitudinal direction of the vehicle body; a shock absorber housing 30 formed under each of the apron upper members 20; a cowl 40 arranged between the apron upper members 20 across a vehicle width direction of the vehicle body; and an engine compartment extension panel 50 which is connected between the cowl 40 and the apron upper member 20 so as to form an extended plane on both sides of the cowl 40 corresponding to the cowl 40. Herein, the apron upper member 20 is integrally formed with the A-pillar 10 in the longitudinal direction of the vehicle body, and both sides of the cowl 40 are cut along the shape of the engine compartment extension panel 50 so as to correspond to the engine compartment extension panel 50. One will appreciate that such integral components may be monolithically formed.

As shown in FIG. 3, the apron upper member 20 is elongated on a front of each of the A-pillars 10 and integrally formed therewith in the longitudinal direction of the vehicle body.

Figure 1B:
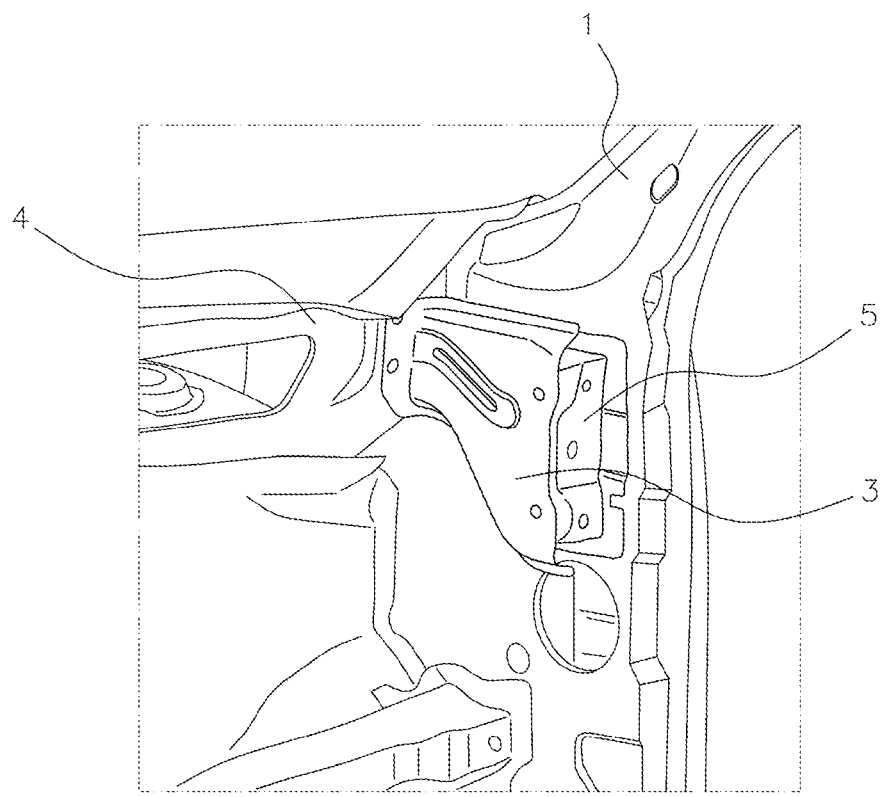
FIG. 1B is a perspective view showing a cowl structure of a vehicle of the related art, which is seen from a vehicle room portion.
Figure 2:
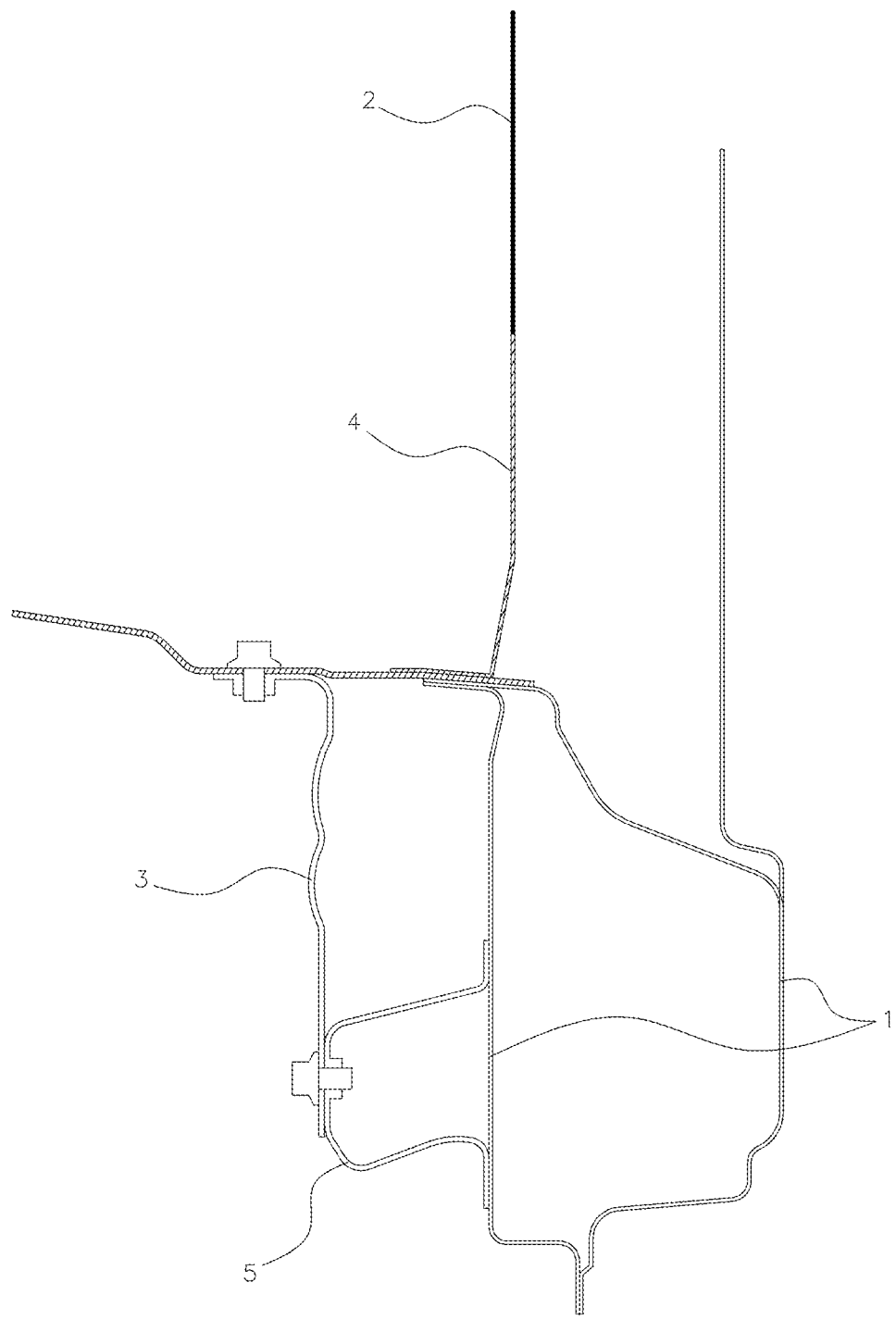
FIG. 2 is a cross-sectional view taken along a line A-A' of FIG. 1A.

That is, in the conventional cowl structure shown in FIG. 1, the apron upper member 2 is formed on the front of the A-pillar 1 spaced apart therefrom, and the cowl 4 is arranged between the A-pillars 1 and the apron upper member 2 in a vehicle width direction of the vehicle body. On the other hand, the cowl structure of a vehicle according to the present invention has a configuration that the apron upper member 20 is integrally formed with the A-pillar 10 to be connected each other and the engine compartment extension panel 50 is connected between the apron upper member 20 and the cowl 40.

Therefore, as shown in FIG. 4, the apron upper member 20 may consists of one piece unlike the conventional apron upper member 2 which consists of two pieces, such that a discontinuous structure in cross section thereof is basically removed, and thus bending mode when a vehicle collides is improved and thereby injury to a driver seated in the driver seat can be improved.

In addition, as shown in FIG. 3, the cowl 40 is arranged between the apron upper members 20 across width direction of the vehicle body, and the engine compartment extension panel 50 is arranged at both sides of the cowl 40 to be connected between the cowl 40 and the apron upper member 20.

As shown in FIG. 5, the engine compartment extension panel 50 forms a plane having a cross section of a continuously expanded shape of cowl 40 corresponding to the cross section of the cowl 40 so as to be smoothly connected to the cowl 40.

The cross sections of the cowl 40 at both sides are also continued to the cross section of the engine compartment extension panel 50 so as to be smoothly connected to the engine compartment extension panel 50. Both sides of the cowl 40 are cut along the shape of the engine compartment extension panel 50.

Figure 6:
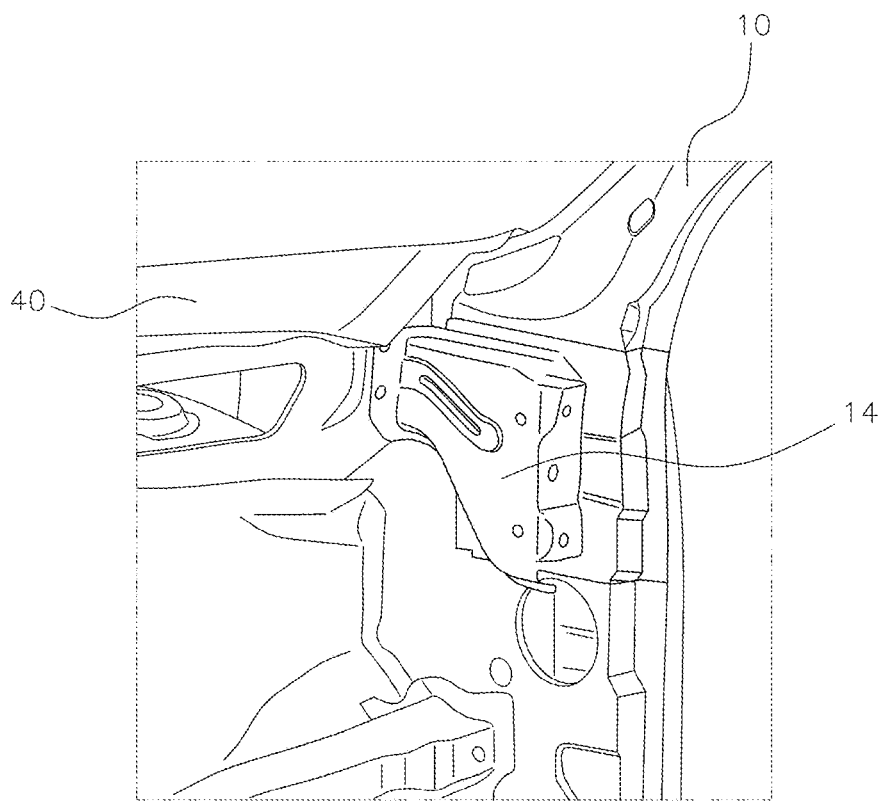
FIG. 6 is an enlarged view showing an exemplary A-pillar and engine compartment extension panel connected each other according to the present invention.
Figure 7:
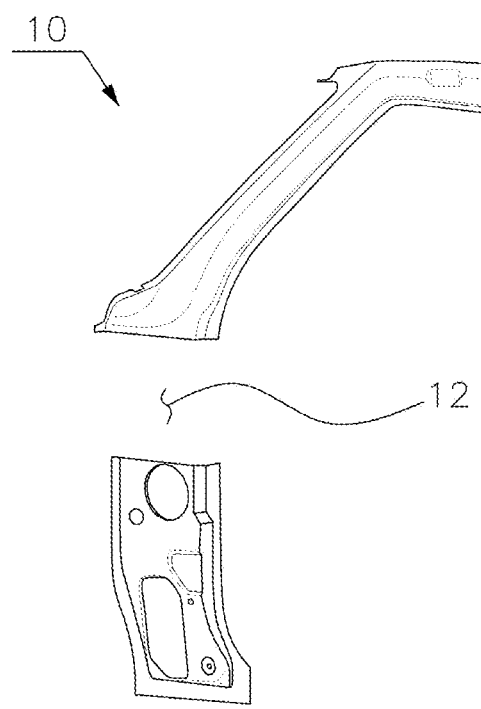
FIG. 7 is a perspective view showing an exemplary A-pillar having a cut-out portion formed thereon according to the present invention.

FIGS. 6 and 7 are views showing a cowl structure of a vehicle according to various embodiments of the present invention. As shown in FIGS. 6 and 7, the A-pillar 10 is provided with a cut-out portion 12 formed thereon at a position near to a rear end of the apron upper member 20. In this regard, the A-pillar extension panel 14 is connected to the A-pillars 10 so as to completely enclose the cut-out portion 12.

In other words, the cut-out portion 12 provided on the A-pillars 10 is formed in a shape to clearly divide the A-pillars 10 up and down, and the A-pillar extension panel 14 is formed in a shape to completely cover and enclose the A-pillars 10.

The A-pillar extension panel 14 has a cross section corresponding to the cross section of the A-pillars 10 wherein, as shown in FIG. 6, the cross section is gradually stepped down toward the rear side based on the plate upper potions, but it is not limited thereto and may be formed in various types depending on the cross section shape of the A-pillars 10.

In addition, the A-pillar extension panel 14 is fixed to the A-pillars 10 by welding unlike the conventional A-pillar extension panel 3 which is fastened to the A-pillar 1 by bolts. Therefore, the A-pillar extension panel 14 is formed in a large plane with replacing the conventional cowl cross bar bracket 5.

As described above, the conventional cowl structure wherein the cowl cross bar bracket 5 and the A-pillar extension panel 3, which are divided into two parts, are fastened by bolts is replaced by the one A-pillar extension panel 14 to be completely combined with the A-pillar 10, thereby as shown in FIG. 6, unnecessary parts can be reduced and the manpower required for bolt fastening work can be reduced.

Figure 8:
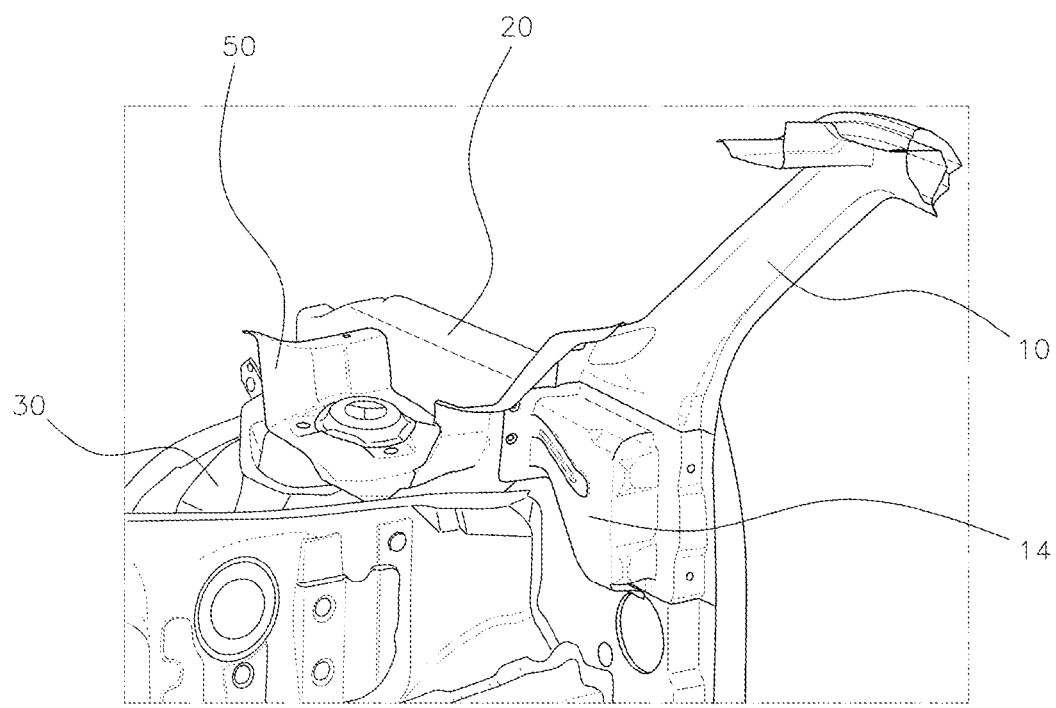
FIG. 8 is an enlarged view showing an exemplary joint part of an engine compartment extension panel according to the present invention.

FIG. 8 is a perspective view showing a cowl structure of a vehicle according to various embodiments of the present invention. As shown in FIG. 8, a front end of the engine compartment extension panel 50 is connected to an upper portion of the shock absorber housing 30 and a rear end thereof is connected to the A-pillar extension panel 14.

The engine compartment extension panel 50 includes holes formed in the front end thereof corresponding to holes formed in the spring cover bracket so as to be connected to the upper portion of the shock absorber housing 30, and a flange formed on the rear end thereof so as to be connected with the A-pillar extension panel 14.

That is, in the conventional vehicle cowl structure, the A-pillar extension panel 3 and the cowl 4 are fastened by bolts because the cowl 4 is integrally formed such that welding on the rear side of the cowl 3 is impossible, however, the A-pillar extension panel 14 according to the present invention can be previously fixed to the engine compartment extension panel 50 by welding before mounting the cowl 40, thus the torsional rigidity of the vehicle body is increased by increasing of the connectivity for the vehicle cowl structure.

Further, the engine compartment extension panel 50 and the A-pillar extension panel 14 according to the present invention may be made of super-high-strength steel.

In other words, in the conventional vehicle cowl structure, the cowl 4 is wholly made of general mild steel because the cowl 4 is integrally formed and molding of the joint part between the cowl 4 and the apron upper member 2 is difficult. On the other hand, in the cowl structure of a vehicle according to the present invention, the cowl 40 and the engine compartment extension panel 50 are separately formed, thus it is possible to increase the rigidity of the cowl structure by only reinforcing the material of the joint part such as the engine compartment extension panel 50 and the A-pillar extension panel 14 without the need to reinforce all of the material in order to increase the rigidity of the cowl structure.

The super-high-strength steel used in the present invention refers to a steel which has a tensile strength of about 980 MPa to 1,300 MPa. However, the present invention not limited thereto, and may include a various steel plates having a tensile strength of 980 MPa or less or 1,300 MPa or more depending on the vehicle's rigidity target.

In addition, by enhancing the material of the engine compartment extension panel 50 and the A-pillar extension panel 14 and reinforcing the thickness thereof, the overall rigidity of the cowl structure of a vehicle is increased, and thereby can achieve the rigidity target corresponding to the small overlap crash test.

According to the cowl structure for a vehicle of the present invention having the above described configuration, an apron upper member is integrally formed with the A-pillar in the longitudinal direction of the vehicle body and an engine compartment extension panel is combined with the both sides of the cowl so as to form an extended plane corresponding to the cowl, and thereby a discontinuous structure in a cross section of the apron upper member can be basically removed, such that structural bending due to a vehicle collision and chest injury to an occupant seated in the driver seat can be improved.

In addition, since the cowl structure for a vehicle of the present invention includes an A-pillar extension panel which is connected to an A-pillar so as to completely enclose a cut-out portion formed on an inner side surface of the A-pillar, a deformation amount in a passenger compartment generated from a vehicle collision can be decreased by increasing the cross-sectional area of the A-pillar joint part and a connectivity of the corner section, and the manpower required for bolt fastening process can be reduced by not employing vehicle body parts such as a cowl cross bar bracket or the like.

In addition, the cowl structure for a vehicle of the present invention has an improved rigidity at the impact point of the vehicle body by connecting an engine compartment extension panel to the A-pillar extension panel from a shock absorber housing, and an increased safety for passengers by dispersing the impact exerted due to the vehicle front collision.

Further, since the engine compartment extension panel and the A-pillar extension panel are made of super-high-strength steel, overall material strength of major parts can be enhanced, while fuel efficiency of a vehicle can be improved by decreasing the vehicle weight and manufacturing costs of a vehicle are reduced.

As a result, according to the cowl structure for a vehicle of the present invention, it is possible to improve the performance of a vehicle small overlap crash by changing the cowl structure of a vehicle and including the engine compartment extension panel and the A-pillar extension panel, increase the torsional rigidity of a vehicle body, and improve noise, vibration, harness (NVH) characteristics and riding and handling (R&H) performance.

For convenience in explanation and accurate definition in the appended claims, the terms upper, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cowl structure of a vehicle comprising:
   A-pillars arranged at opposing sides of a vehicle body extending in a vertical direction of the vehicle body;
   an elongated apron upper member arranged on a front of each of the A-pillars and extending in a longitudinal direction of the vehicle body;
   a shock absorber housing formed under each of the apron upper members;
   a cowl arranged between the apron upper members extending across a vehicle width direction of the vehicle body; and
   an engine compartment extension panel extending between and interconnecting the cowl and the apron upper member to form an extended planar surface on opposing sides of the cowl corresponding to the cowl,
   wherein the A-pillar further comprises a cut-out portion formed thereon at a position adjacent a rear end of the apron upper member, and the A-pillar extension panel is connected to the A-pillar to completely enclose the cut-out portion.

2. The cowl structure of claim 1, wherein the apron upper member is integrally formed corresponding to the A-pillar in the longitudinal direction of the vehicle body, and the opposing sides of the cowl are cut along the shape of the engine compartment extension panel so as to correspond to the engine compartment extension panel.

3. The cowl structure of claim 1, wherein a front end of the engine compartment extension panel is formed with an upper portion of the shock absorber housing and a rear end thereof is connected to the A-pillar extension panel.

4. The cowl structure of claim 1, wherein the engine compartment extension panel and the A-pillar extension panel are made of super-high-strength steel.

* * * * *